United States Patent [19]
Chudy et al.

[11] Patent Number: 4,833,898
[45] Date of Patent: May 30, 1989

[54] MULTI-DETECTOR DEWAR

[75] Inventors: John S. Chudy, Long Beach; M. John Kniffin; D. Yvonne McNeil, both of Santa Ana, all of Calif.

[73] Assignee: Ford Aerospace & Communications Corporation, Detroit, Mich.

[21] Appl. No.: 68,300

[22] Filed: Jul. 1, 1987

Related U.S. Application Data

[63] Continuation of Ser. No. 1,063, Jan. 7, 1987, abandoned.

[51] Int. Cl.$^4$ ............................................. F25B 19/00
[52] U.S. Cl. .................................... 62/51.1; 250/352
[58] Field of Search ....................... 62/514 R; 250/352

[56] References Cited

U.S. PATENT DOCUMENTS

| | | | |
|---|---|---|---|
| 3,415,994 | 12/1968 | Fitti, Jr. ............................... | 250/83.3 |
| 3,851,173 | 11/1974 | Taylor & Whicker ............. | 250/332 |
| 3,962,578 | 6/1976 | Roschen ............................... | 250/226 |
| 4,487,037 | 12/1984 | Meignin et al. .................... | 62/514 R |
| 4,528,449 | 7/1985 | Gordon et al. ...................... | 250/352 |

FOREIGN PATENT DOCUMENTS 2082763A 7/1980 United Kingdom .

Primary Examiner—Ronald C. Capossela
Attorney, Agent, or Firm—Edward J. Radlo; Harry G. Weissenberger; Keith L. Zerschling

[57] ABSTRACT

Consolidation of active and passive detectors (26, 28, 34) on a single coldfinger (20) in a dewar (10) is made possible by interposing between the detectors (26, 28, 34) an electromagnetic interference shield (64, 68) which acts as a waveguide filter blocking any interfering frequencies. The waveguide is formed by a pair of spaced interleaved shields (64, 68) one of which (64) is associated with the dewar envelope and is externally grounded, and the other of which is associated with the coldfinger (20). Photons which penetrate through the waveguide (64, 68) are deflected to the outside of the dewar (10) by a flanged narcissus shield (40) surrounding the passive detector (34). Alignment of the detectors (26, 28, 34) and assembly of the dewar (101) is greatly facilitated by constructing the envelope in several generally cylindrical sections (14, 16, 18), the lowermost one of which (14) is shorter than the coldfinger (20); and by fusing the coldfinger (20) and lowermost envelope section (14) to a metal mounting base (12) prior to the final assembly of the dewar (10).

14 Claims, 3 Drawing Sheets

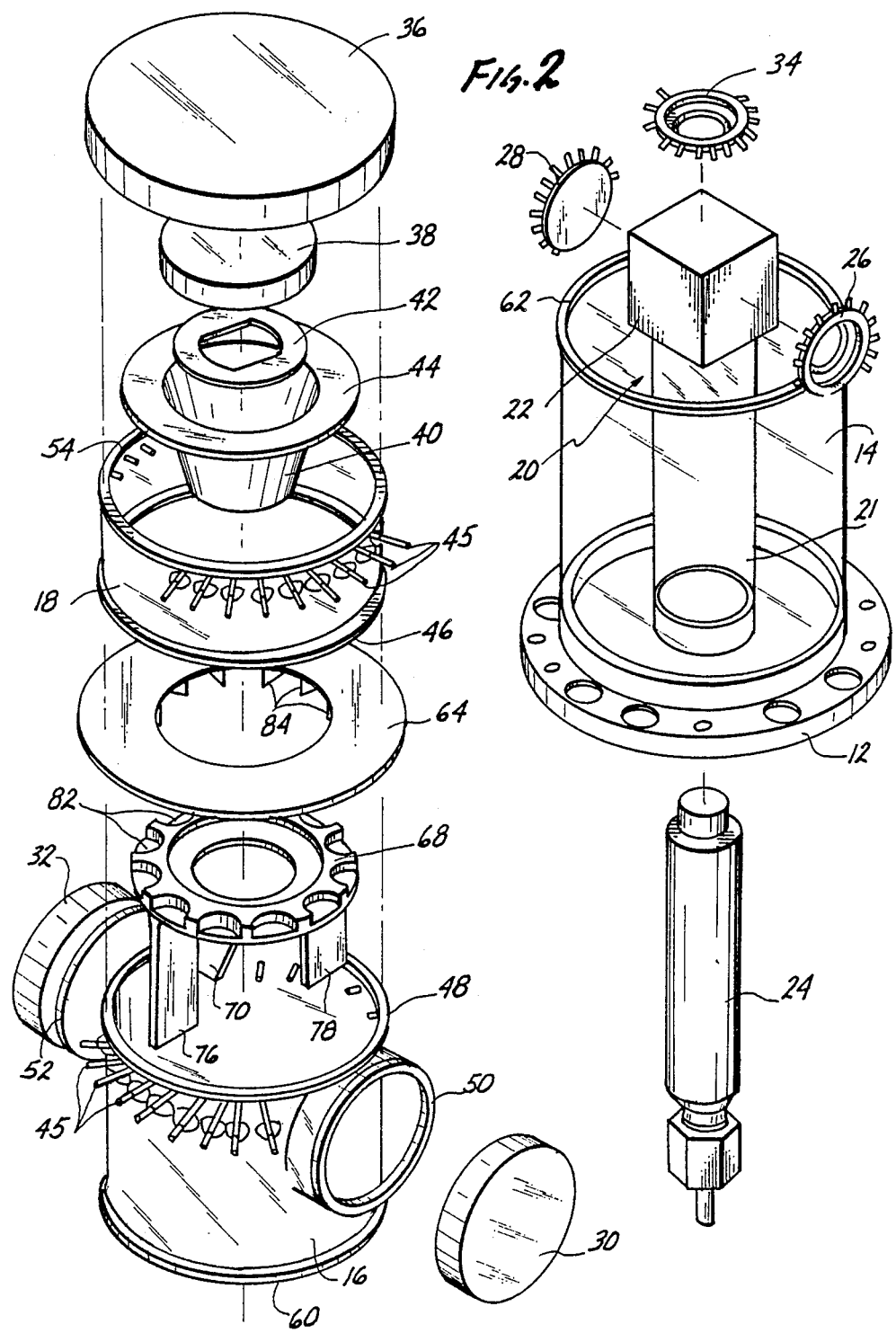

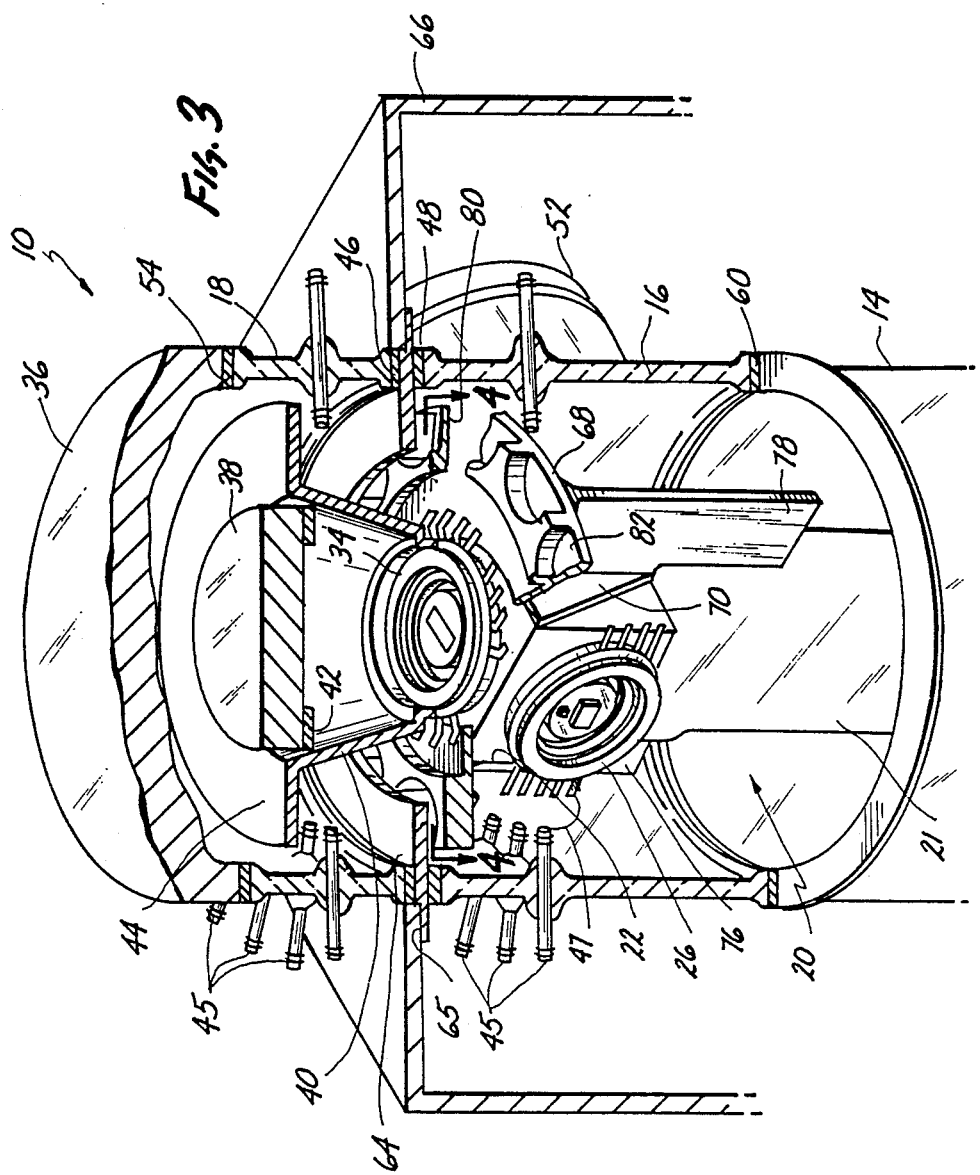

4,833,898

MULTI-DETECTOR DEWAR

DESCRIPTION

This application is a continuation of application Ser. No. 001,063 filed Jan. 7, 1987, now abandoned.

1. Technical Field

This invention relates to dewars, and more particularly to a dewar containing multiple detectors optically and electromagnetically isolated from one another.

2. Background Art

High-precision optical guidance systems for high-speed air vehicles (as well as other multi-wavelength systems such as satellite spectrographs) can require the simultaneous use of several cryogenic optical devices operating in different frequency ranges, which must be carefully aligned with one another. The frequency and power characteristics of these systems are widely divergent.

The extreme precision with which the systems must operate makes it necessary to align them very accurately with respect to each other so that their information may be properly correlated. This requirement presented several problems in the prior art. To begin with, the traditional way of making dewars involved complete fabrication of the dewar itself, followed by the bonding of the glass envelope to a metallic mounting base by a bonding agent such as epoxy. Alignment of the detectors with the reference plane provided by the mounting base was difficult for two reasons: firstly, the detector was no longer visible within the silvered dewar after fabrication, so that alignment had to be done by placing the hollow coldfinger stem onto a mandrel; and secondly, the poor tolerances of the glass envelope and the unpredictable shrinkage of the epoxy presented a substantial potential of misalignment.

Another problem of the prior art arose from the fact that replacement of one of several separate dewars after the original manufacture of the equipment required a careful realignment of the apparatus. This can be done fairly routinely in a factory environment but is difficult to do at maintenance facilities in the field. It would therefore be desirable to mount all the detectors in a single, easily factory-alignable part, particularly inasmuch as such a single-piece construction would allow the use of a single cryogenic element with a resulting substantial reduction in weight, size and cost.

Unfortunately, consolidation of several detectors in a single dewar has not been practical in the past because the lowest power detector array was subject to being overwhelmed by stray optical and electromagnetic interference from one or more of the other optical systems. Under these circumstances, serious electromagnetic interference was apt to occur. Consequently, complete physical separation of the detector systems was the only practical prior art approach.

The following publications are representative of the prior art in this field: U.S. Pat. No. 3,415,994, which shows a dual-element infrared detector; U.S. Pat. No. 3,851,173, which shows a cryogenic assembly for an infrared detector; U.S. Pat. No. 3,962,578, which shows cascaded photoelectric detector elements with an integral filter for two-color detection; U.S. Pat. No. 4,487,037, which shows a single-array dewar construction; U.S. Pat. No. 4,528,449, which shows a single-array dewar using metal subassemblies for improved serviceability; and published British application No. 2,082,763A, which shows a cascaded infrared detector with sensors of different composition.

DISCLOSURE OF INVENTION

The present invention makes it possible to combine detectors (26, 28, 34) in a single dewar (10) by providing a novel method of optical and electromagnetic shielding inside the dewar (10).

More specifically, two of the detectors (26, 28) envisioned in the preferred embodiment are positioned on opposite lateral sides of a cube-shaped pedestal (22) cooled by a cryogeic finger (20). An optical and RF electromagnetic shield (40, 64, 68) is interposed within the dewar (10) between the side mounted detectors (26, 28), as well as between the side mounted detectors (26, 28) and a third, tip-mounted detector (34). The optics and electronics for the side-mounted detector arrays (26, 28) are disposed laterally of the dewar (10) on opposite sides thereof within a grounded metallic external shield (66) connected to the interior shield (40, 64, 68) of the dewar (10). The optics for the tip-mounted detector array (34) are disposed in front of the tip of the dewar (10), and the corresponding electronics are positioned outside the external shield (66).

The interface shield (40, 64, 68) inside the dewar (10), besides forming a light barrier, is configured to act as a radio-frequency (RF) waveguide (64, 68) which does not pass the frequencies at which the high-power systems operate. In this manner, the transmission of energy from one system into another system is effectively prevented without interposing an impervious physical barrier between the upper and lower portions of the dewar (10).

To facilitate alignment and assembly, the envelope of the dewar (10) of this invention consists of three sections. One of these is a generally cylindrical base section (14) which is shorter, in an axial direction, than the coldfinger (20). In the inventive dewar (10), the coldfinger stem (21) and the bottom rim of this base section (14) are separately fused onto a metallic mounting base (12) prior to assembly of the dewar (10). Consequently, the detector-supporting pedestal (22) is visible above the upper rim of the base section (14) during the fusing of the base envelope section (14) and coldfinger (20) to the mounting base (12). As a result, the detector-supporting pedestal (22) can be aligned with respect to the reference plane formed by the bottom surface of the mounting base (12) with a high degree of accuracy during the fabrication of the dewar (10).

BRIEF DESCRIPTION OF THE DRAWINGS

These and other more detailed and specific objects and features of the present invention are more fully disclosed in the following specification, reference being had to the accompanying drawings, in which:

FIG. 2 is an exploded perspective view of the dewar 10 of FIG. 1;

FIG. 3 is a broken-away partial perspective view of the windowed portions of the dewar 10 of FIG. 1.

BEST MODE FOR CARRYING OUT THE INVENTION

Figure 1:
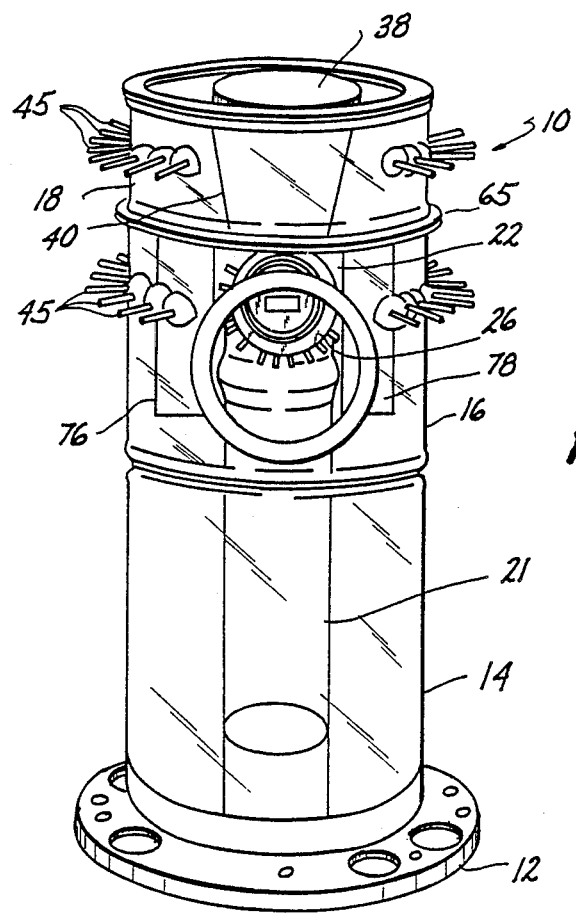
FIG. 1 is an assembled perspective view of the dewar 10 of this invention with the entrance windows 30, 32, 36 removed.

As shown in FIGS. 1 and 2, the inventive dewar 10 is supported on a mounting base 12 and includes an evacuated glass envelope composed of a base section 14, a side window section 16, and an end window section 18. In the assembly of the dewar 10, the mounting base 12 and the sections 14, 16 and 18 are fused together to form a single evacuated chamber.

A coldfinger 20 is conventionally supported in an axial position on the mounting base 12. The interior of the glass stem 21 of coldfinger 20, and with it the metallic detector support or pedestal 22 fused to the top of stem 21, is conventionally maintained at an extremely low temperature by an appropriate cryogenic unit 24 (FIG. 2) typically cooled by liquid nitrogen.

The base section 14 of the envelope and the stem 21 of coldfinger 20 are fused to the mounting base 12 at their bottom rims. The fact that the detector support 22 protrudes above the upper rim of base section 14, and is freely accessible when mounting base 12, base section 14, and coldfinger 20 are assembled together, makes it possible accurately to align the detector-carrying surfaces of the pedestal 22 with respect to the reference plane formed by the underside of mounting base 12 before the assembly of dewar 10 is completed.

In accordance with the invention, detector support 22 is configured as a cube. Two opposed lateral sides of cube 22 support detector 26 and detector 28, respectively. The detectors 26 and 28 receive radiant energy through the respective windows 30, 32 and optical systems (not shown) which direct the desired radiant energy toward the detectors 26, 28 from opposite sides of the dewar 10.

The top surface of the cryogenic detector support cube 22 supports a third detector array 34. Detector 34 is illuminated through a germanium window 36 and a cold filter 38, which together form a conventional dichroic filter limiting the illumination of detector 34 to a narrow spectral region.

The cold filter 38 is disposed at the outer end of a narcissus filter 40 and is separated from the interior of filter 40 by a slotted disc 42 which restricts the field of view of he third detector 34 to the forward direction so as to minimize any interference from outside lateral heat sources. The upper rim of the narcissus filter 40 is provided with an annular photon flange 44 whose function will be discussed in more detail hereafter.

As described above, the glass envelope of the dewar in the preferred embodiment of the invention is formed in three parts: base envelope section 14 fused to mounting base 12, side window envelope section 16, and end window envelope section 18. The latter two sections 16, 18 contain contact pins 45 for connecting the system electronics to the detectors 26, 28 and 34. The detectors 26, 28 and 34 are connected to the pins 45 by fine leads such as 47 (FIG. 3), only one of which is shown so as not to clutter the drawing. It is these leads 47 which can generate wideband electromagnetic interference whose fundamental frequency is prone to be detected by the electronics of the third detector 34.

All sections 14, 16, 18 of the envelope are preferably substantially cylindrical. The side window and end window sections 16, 18 are joined together by metal fusion rings 46, 48. Side window seats 50, 52 are formed on envelope section 16, and an end window seat 54 is formed on envelope section 18. The side window seats 50, 52 receive windows 30, 32, respectively, while the end window seat 54 receives the germanium window 36 discussed above. The assembly of envelope sections 16, 18 is in turn joined to the base envelope section 14 by fusion rings 60, 62.

A ring-shaped grounded interference shield 64 is interposed between fusion rings 46, 48 and is of sufficient diameter to provide an external flange 65 (FIGS. 1 and 3) suitable for connection to an external opaque grounded shield 66 which maintains the optics and electronics of the side-mounted systems (which might typically be high-power active systems) in electromagnetic isolation from the optics and electronics of the tip-mounted system (which might typically be a low-power passive system).

Seated on cube 22 is a coldfinger interference shield 68 which is electrically connected to cube 22 and is held thereon against rotation by flanges 70 which lie against the unused lateral surfaces of cube 22 and also hold the shield 6 in axial alignment with cube 22.

Figure 4:
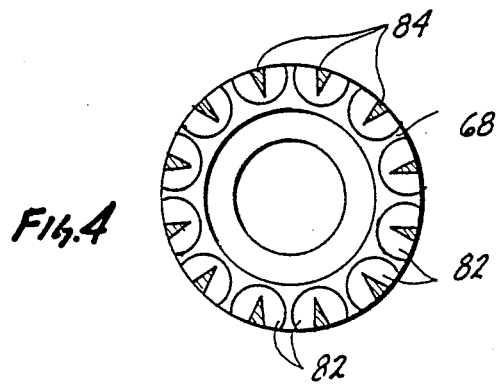
FIG. 4 is a horizontal section along view lines 4—4 of FIG. 3.

Flaps 76, 78 depend from the undersurface of shield 68 to provide an optical barrier between the two detectors 26, 28. The upper surface of the coldfinger interference shield 68 is provided with semicircular recesses 82. When the dewar 10 is assembled, the recesses 82 receive wedge-shaped appendages 84 formed on the underside of grounded shield 64, in an arrangement best seen in FIG. 4. The appendages 84 are spaced from the bottom of the recesses 82 by a gap 80. Dimensioned in accordance with conventional waveguide design principles, the recesses 82 and appendages 84 interact to form a high-pass waveguide filter which absorbs any electromagnetic radiation at or below the operating range of the system.

Although all RF electromagnetic interference below the waveguide cutoff frequency is barred by the above-described waveguide filter action from penetrating through the central opening of grounded shield 64, some optical energy may reach the end window envelope section 18 in the form of photons. The flange 44 of the narcissus filter 40 then comes into play to channel those photons into a direction where they exit the dewar 10 through the germanium window 36 without affecting detector 34.

The use of the metallic cube 22 as a support for the detectors 26, 28 and 34 has several advantages. For one, it provides a good electromagnetic shield between the detectors; for another, it maintains the detectors at an even temperature; and last but not least, it makes possible, in conjunction with the above-described base construction, an extremely accurate alignment of the detectors with respect to one another. Whereas fused glass assemblies can be manufactured to tolerances no better than the $10^{-2}$ cm range, metallic cube 22 provides a precision surface which can be very accurately referenced to the external locating features of the mounting base 12. Consequently, factory-aligned dewars 10 of this invention can be replaced in the field with little or no mutual realignment of the optical systems—a great advantage in the real world.

It will be seen that the present invention makes possible the incorporation of multiple detectors 26, 28, 34 in a single factory-aligned dewar 10 even though they may operate at badly interfering frequencies, by providing an effective way of internally shielding the detectors 26, 28, 34 from one another without establishing a heat-transferring metallic path between the coldfinger 20 and the outside of the dewar 10. It will be noted, in that respect, that there is a vacuum between the grounded shield 64 (which is at room temperature) and the coldfinger shield 68 (which is at a cryogenic temperature).

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A multi-detector dewar, comprising:
   an evacuated envelope;
   a single coldfinger maintained at cryogenic temperature within said envelope;
   active and passive system detectors mounted on said coldfinder; and
   interference shielding means inside said dewar for preventing the transmission of electromagnetic energy between said active and passive system detectors, said interference shielding means including high-pass waveguide means so disposed between said active and passive system detectors that electromagnetic energy traveling between said detectors must pass through said waveguide means; wherein
   said waveguide means are formed of at least two spaced cooperating parts, one of which is in physical contact with said coldfinger, and the other of which is in physical contact with said envelope.

2. A multi-detector dewar, comprising:
   an evacuated envelope;
   a single coldfinger maintained at cryogenic temperature within said envelope;
   active and passive system detectors mounted on said coldfinger; and
   interference shielding means inside said dewar for preventing the transmission of electromagnetic energy between said active and passive system detectors, said interference shielding means including high-pass waveguide means so disposed between said active and passive system detectors that electromagnetic energy traveling between said detectors must pass through said waveguide means;
   said dewar further comprising means for causing photons passing through said shielding means to exit said dewar 3. A multi-detector dewar, comprising:
   (a) an evacuated envelope;
   (b) a coldfinger disposed within said envelope, said coldfinger including a glass stem and a metallic detector support affixed thereto;
   (c) several detectors mounted on said support, at least a first one of said detectors being adapted to operate at a substantially higher power level than at least a second one of said detectors; and
   (d) interference shielding means disposed within said envelope between said first and second detectors for preventing electromagnetic energy from traveling from the vicinity of said first detector to the vicinity of said second detector.

4. The dewar of claim 3, in which said interference shielding means are configured to form, between said first and second detectors, a high-pass waveguide.

5. The dewar of claim 4, in which said waveguide is formed by at least a pair of metallic elements generally parallel to one another but spaced from one another, and configured to form a waveguide between them.

6. The dewar of claim 5, in which said elements are so disposed with respect to one another as to also form an optical barrier between the vicinities of said first and second detectors.

7. The dewar of claim 5, in which one of said elements protrudes through said envelope.

8. The dewar of claim 5, in which said one of said elements is electrically connected to an external electromagnetic shield surrounding said dewar.

9. The dewar of claim 7, in which another of said elements is carried by, and electrically connected to, said detector support.

10. The dewar of claim 3, further comprising a narcissus filter surrounding said second detector.

11. The dewar of claim 10, in which illumination of said second detector is provided through a window, and said narcissus filter has an annular flange so disposed as to direct through said window any photons which pass through said interference shielding means.

12. The dewar of claim 3, in which said detector support is in the form of a cube bonded to said stem at its bottom, said cube supporting said detectors on its side and top faces, respectively.

13. The dewar of claim 12, in which a pair of relatively high-power detectors are mounted on opposite side faces of said cube, a relatively low-power detector is mounted on the top face of said cube, and said interference shielding means are disposed between the side surfaces and the top surface of said cube.

14. The dewar of claim 12, in which said interference shielding means includes opaque flaps disposed substantially perpendicularly to the remaining side surfaces of said cube between said detectors.

* * * * *